US007953242B2

(12) United States Patent
Soga

(10) Patent No.: US 7,953,242 B2
(45) Date of Patent: May 31, 2011

(54) IMAGE DISPLAY APPARATUS

(75) Inventor: Takayuki Soga, Fukaya (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1093 days.

(21) Appl. No.: 11/448,815

(22) Filed: Jun. 8, 2006

(65) Prior Publication Data
US 2006/0279666 A1 Dec. 14, 2006

(30) Foreign Application Priority Data

Jun. 9, 2005 (JP) ................................ 2005-169708

(51) Int. Cl.
H04R 25/00 (2006.01)
(52) U.S. Cl. .................... 381/388; 381/306; 381/333
(58) Field of Classification Search .......... 381/306–308, 381/332–333, 386–388, 392–395; 361/676–682
See application file for complete search history.

(56) References Cited

U.S. PATENT DOCUMENTS

| 6,925,188 | B1 * | 8/2005 | Markow et al. | 381/306 |
|---|---|---|---|---|
| 7,120,265 | B2 * | 10/2006 | Sperle et al. | 381/306 |
| 7,410,029 | B2 * | 8/2008 | Tanaami | 381/306 |
| 2003/0128503 | A1 | 7/2003 | Takahashi | |
| 2005/0001949 | A1 | 1/2005 | Kawamoto et al. | |

FOREIGN PATENT DOCUMENTS

| CN | 1878424 | 12/2006 |
|---|---|---|
| JP | 04-322579 | 11/1992 |
| JP | 06-319095 | 11/1994 |
| JP | 08-37692 | 2/1996 |
| JP | 08-047098 | 2/1996 |
| JP | 09-055903 | 2/1997 |
| JP | 2003-174692 | 6/2003 |
| JP | 2005-24875 | 1/2005 |

OTHER PUBLICATIONS

Notification of First Office Action issued by the Chinese Patent Office in Application No. 200610087104.6, on Nov. 9, 2007.
Notice of Reason for Rejection issued by the Japanese Patent Office in corresponding Japanese Patent Application No. 2005-169708, on Feb. 16, 2010.

* cited by examiner

Primary Examiner — Suhan Ni
(74) Attorney, Agent, or Firm — Finnegan, Henderson, Farabow, Garrett, Dunner, L.L.P.

(57) ABSTRACT

A speaker mounting region looks smaller as viewed from the front side. An image display apparatus comprises a frame forming portion located at the lower part of a front frame, a rectangular sound emitting unit formed in a horizontal direction of the frame forming portion, first and second walls to have a horn shape for the sound emitting unit, a third wall which continues to the front side of the lower second wall and is tilted and retreated while being bent as it goes downwards, and a remote control signals receiving window, supporting portions, speaker devices mounted on the supporting portions, and a substrate having a remote control circuit mounted thereon.

9 Claims, 9 Drawing Sheets

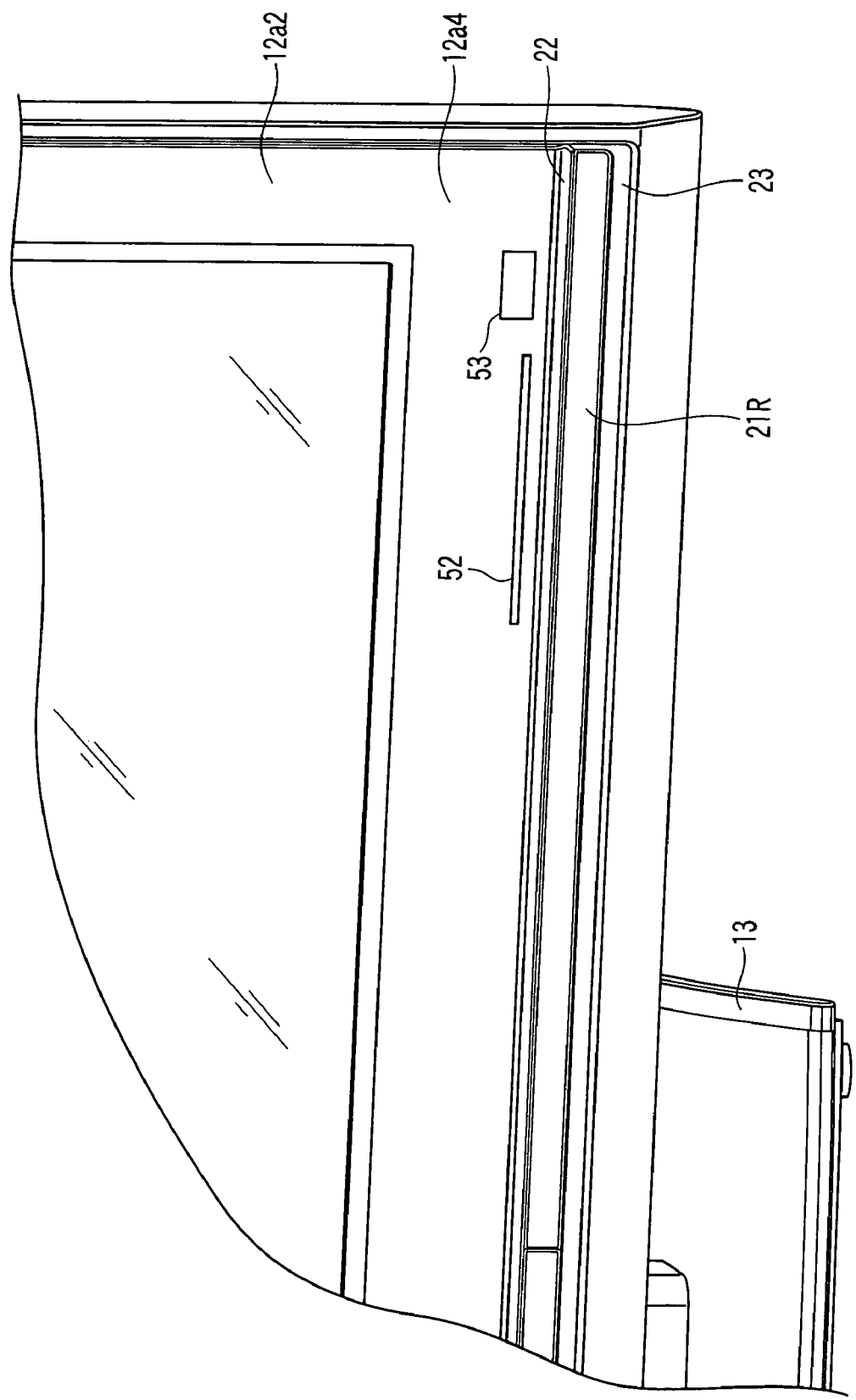
F I G. 2

IMAGE DISPLAY APPARATUS

CROSS-REFERENCE TO RELATED APPLICATIONS

This application is based upon and claims the benefit of priority from Japanese Patent Application No. 2005-169708, filed Jun. 9, 2005, the entire contents of which are incorporated herein by reference.

BACKGROUND

1. Field

One embodiment of the invention relates to an image display apparatus of, for example, a digital TV broadcast receiving apparatus or the like, and more specifically, to an image display apparatus in which contrivances are made to a structure of a frame as a part of a cabinet and speaker arrangement, etc. along with improvement of an appearance as seen from the front side.

2. Description of the Related Art

In recent years, digitization of TV broadcasting has been promoted. For example, in Japan, not only satellite digital broadcasting such as broadcasting satellite (BS) digital broadcasting and 110-degree communication satellite (CS) digital broadcasting, but also terrestrial digital broadcasting has been started.

Presently, TV broadcast receiving apparatuses with thin-shaped and large screens, which employ flat panel displays composed of a liquid crystal display, a plasma display, an SED display, and the like as image display units thereof, are likely to gain popularity.

Even in an image display apparatus with a thin-shaped increased-size screen, speakers are essential to obtain audio outputs. Speakers must be mounted on a cabinet with care to prevent acoustic effects from decreasing. To achieve this, the frame at the front side of the cabinet and its design, and a speaker mounting structure are mutually related.

For example, in Jpn. Pat. Appln. KOKAI Publication No. 2003-174692, a thin-shaped image display apparatus is disclosed. In this publication, a speaker mounting structure that can further reduce a wall thickness of right and left of the image display apparatus (the depth size is reduce) is disclosed. Also in Jpn. Pat. Appln. KOKAI Publication No. 2005-24875, a thin-shaped image display apparatus is disclosed. In addition, in Jpn. Pat. Appln. KOKAI Publication No. 08-037692, there is disclosed a structure to guide a sound emitting unit of a speaker device located at the rear to a frame on the front of a receiver.

In the case of a thin-shaped image display apparatus, a speaker mounting place is also restricted because of its thinned shape. Since there is little clearance on the back face of a display screen, speakers are arranged around the display screen. For example, speakers are arranged at the bottom of the display screen.

In the case of a conventional image display apparatus, a sound emitting unit is installed at the edge of a front frame, and for the sound emitting unit, an area same as that of a speaker opening is assigned. Consequently, when the edge of the frame is seen, there exist a region of a display screen and a region of the sound emitting unit substantially equal to the speaker opening. Now, in the case where, for example, design is made to reduce the edge width as viewed from the front side of the frame edge around the display screen, it becomes difficult to mount a speaker.

BRIEF SUMMARY OF THE INVENTION

In one embodiment to be explained hereinafter, it is an object of the present invention to provide an image display apparatus in which improvement is made so as to make a speaker mounting region of a frame edge look smaller as viewed from the front side, and this structure can be utilized as a new function.

According to one embodiment of the present invention, there is provided an image display apparatus with an image display unit and a speaker device mounted on a cabinet, comprising: a front frame forming the cabinet, on which a display screen of the image display unit is arranged so as to be exposed from an opening at the center thereof; and a frame forming portion which forms a part of the front frame and is positioned at the lower part of the front frame.

Opposite surfaces which open elongatedly in a longitudinal direction of the frame forming portion and which form a horn part with the opening used for a front opening have following portions. That is, there is provided: sound emitting units which form a rear opening at a position where the opposite surfaces are tentatively retreated while being bent to come close to each other as they are oriented from the front opening to the rear opening as viewed from the cross section; a remote control signal receiving window or an indicator window formed in the frame forming portion in the vicinity of the sound emitting unit of the frame forming portion; and supporting portions 15a to 15f formed upright on the rear face of the frame forming portion.

Further, there are provided speaker devices, mounted on the supporting portions and having an opening which serves as an acoustic output unit, the opening being communicated with the rear opening of the sound emitting unit; and a substrate arranged between the speaker device and the frame forming portion so as to be opposed to the remote control signal receiving window or the indicator window, the substrate having a remote control circuit mounted thereon.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a view showing a part of FIG. 1 in an enlarged manner;

DETAILED DESCRIPTION

Various embodiments according to the invention will be described hereinafter with reference to the accompanying drawings. In general, according to one embodiment of the invention, an image display apparatus according to an embodiment of the present invention can achieve a design which makes a speaker mounting region look smaller when it is seen from a front side of a cabinet. In addition, because its substrate is arranged in a clearance between a unit substrate of a speaker device and a frame forming portion, there is no need to expand the width W1 of the frame forming portion.

Figure 1:
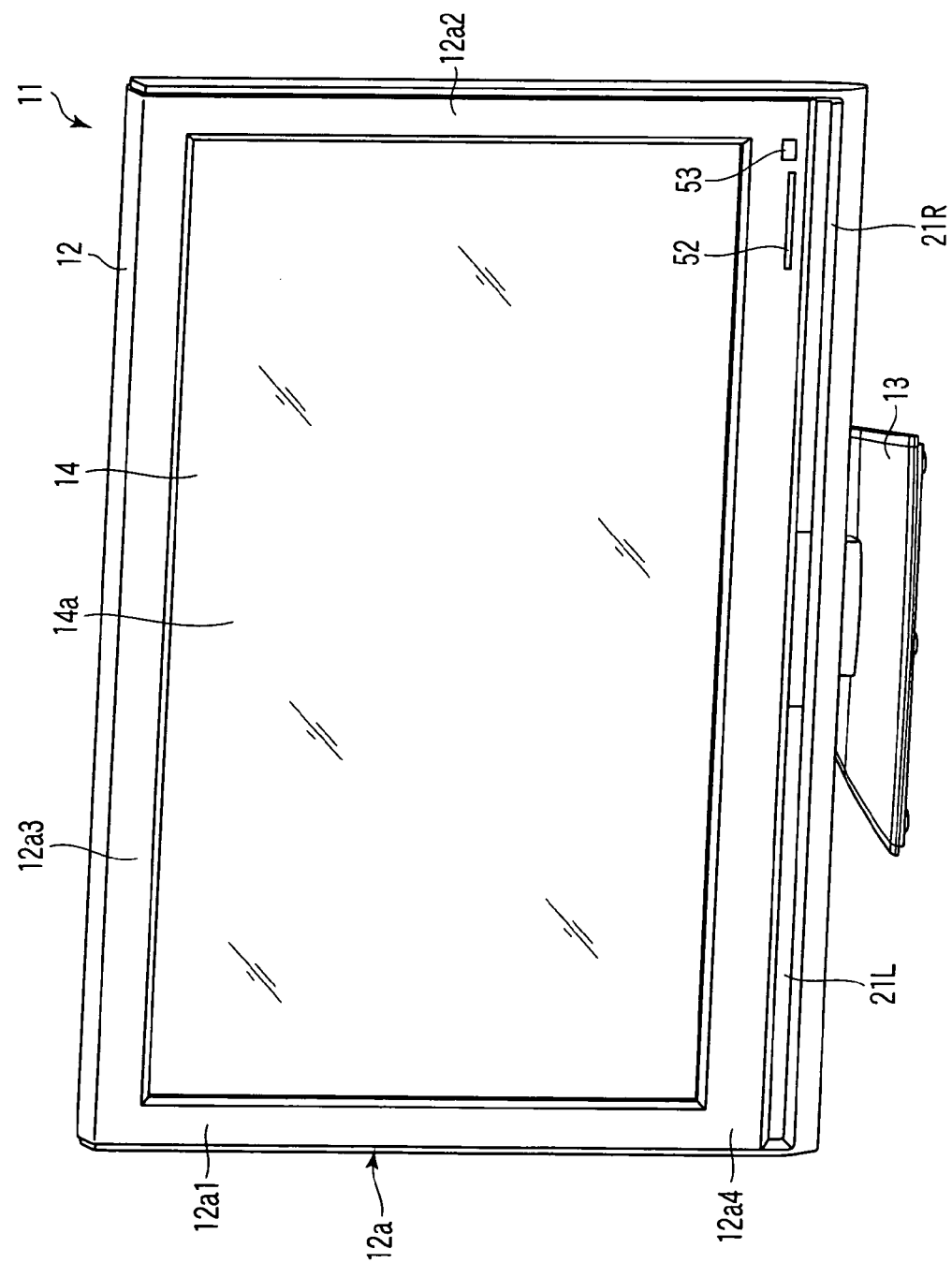
FIG. 1 is a view showing an overview of an image display apparatus which is one embodiment.

Now, an embodiment will be described in detail. FIG. 1 shows the appearance of the front side of a TV broadcast receiving apparatus 11 to be explained in this embodiment. The TV broadcast receiving apparatus 11 is primarily composed of a thin-shaped cabinet 12 formed into a substantially quadrangle, the cabinet serving as an apparatus main body, and a stand 13 which supports the cabinet 12 upright. The stand 13 is formed into a substantially thin-shaped box.

The cabinet 12 has a front frame 12a. The frame 12a is formed by frame forming portions 12a1, 12a2, 12a3 and 12a4 which are arranged right and left and top and bottom to configure the front frame 12a. In this case, the structure of the frame forming portion 12a4 at the bottom has characteristics in particular, which will be explained in detail later.

From an opening of the frame 12a of the cabinet 12, a display screen 14a of an image display unit 14 composed of, for example, a flat type liquid crystal display panel or the like is exposed. Herein, explanation is made with a horizontal scanning line direction designated as right and left and a vertical direction as top and bottom when viewing the screen from the front side.

On the frame forming portion 12a4 located at the bottom of the frame 12, right and left sound emitting units 21L and 21R are formed in a slit form in a lateral direction as viewed from the front side. Furthermore, under this condition, the frame forming portion 12a4 is designed to reduce its width W1 as minimum as possible as viewed from the front side. Nets are put up to thee sound emitting units 21L and 21R to prevent dust or the like from coming into the cabinet 12.

Moreover, above the sound emitting unit 21R, a slit-form indicator window 52 and a rectangular remote control signal receiving window 53 are provided in the frame forming portion 12a4.

FIG. 2 is an enlarged view of the periphery of the sound emitting unit 21R. Top and bottom walls 22 and 23 which configure the sound emitting unit 21R have an ingenious profile to improve acoustic effects. The walls 22 and 23 are formed into a horn shape in which the walls bend and expand in directions in which they depart from each other as they head from the sound emitting opening to the front as viewed from the cross section. The profile and acoustic effects will be explained further in detail later.

As described above, the sound emitting unit has a feature in that it is formed as a slender opening portion in the lateral direction in the frame forming portion 12a4 and has a shape which forms a rear opening at a position where the upper and lower walls 22 and 23 of the opening portion are tentatively retreated while being bent to come close to each other from the vertical direction as the shape as viewed from the cross section is oriented from a front opening to the rear opening, in order to obtain a horn shape at the opening portion.

Figure 3:
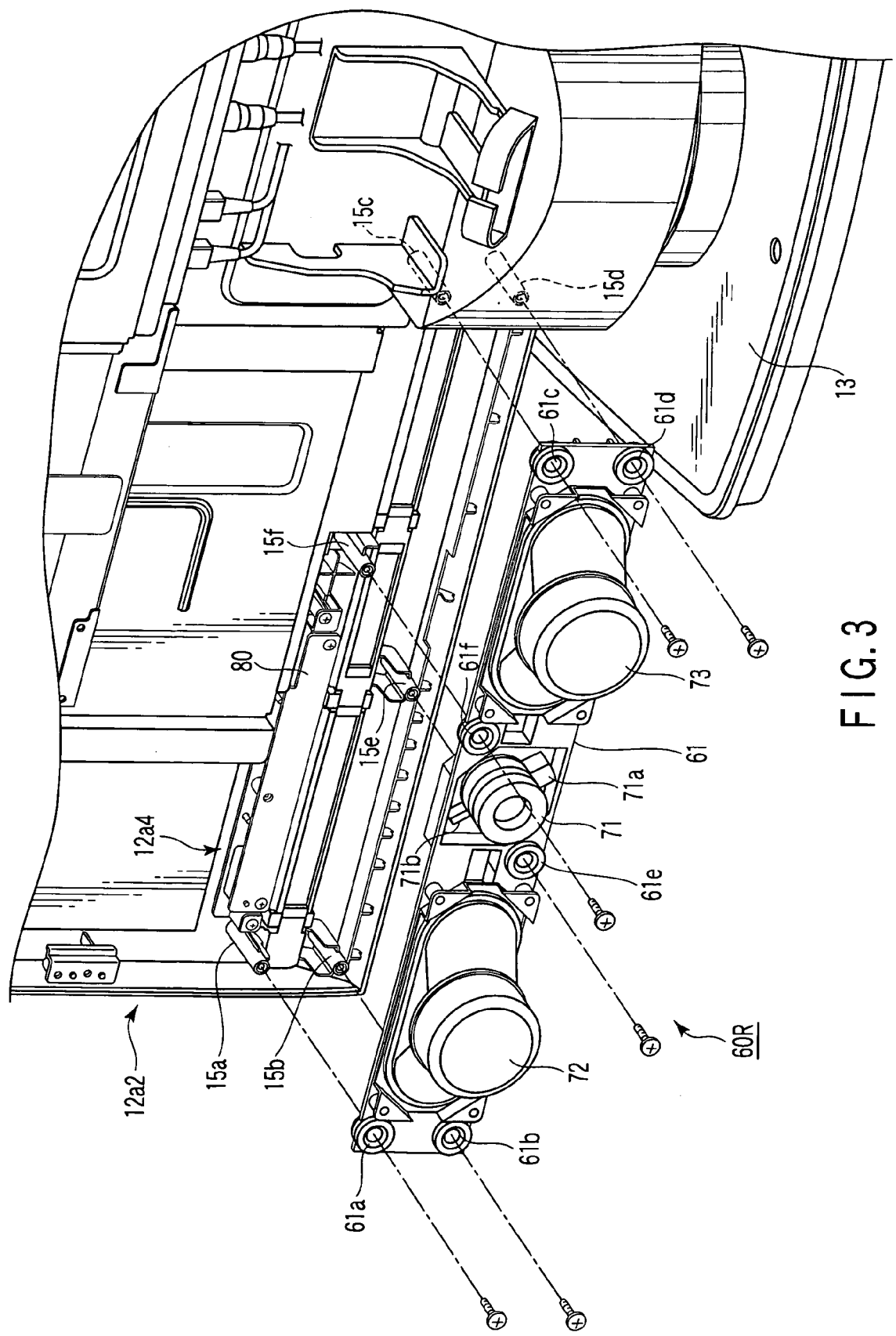
FIG. 3 is a perspective view showing the back side of a sound emitting unit 21R of FIG. 1.
Figure 4:
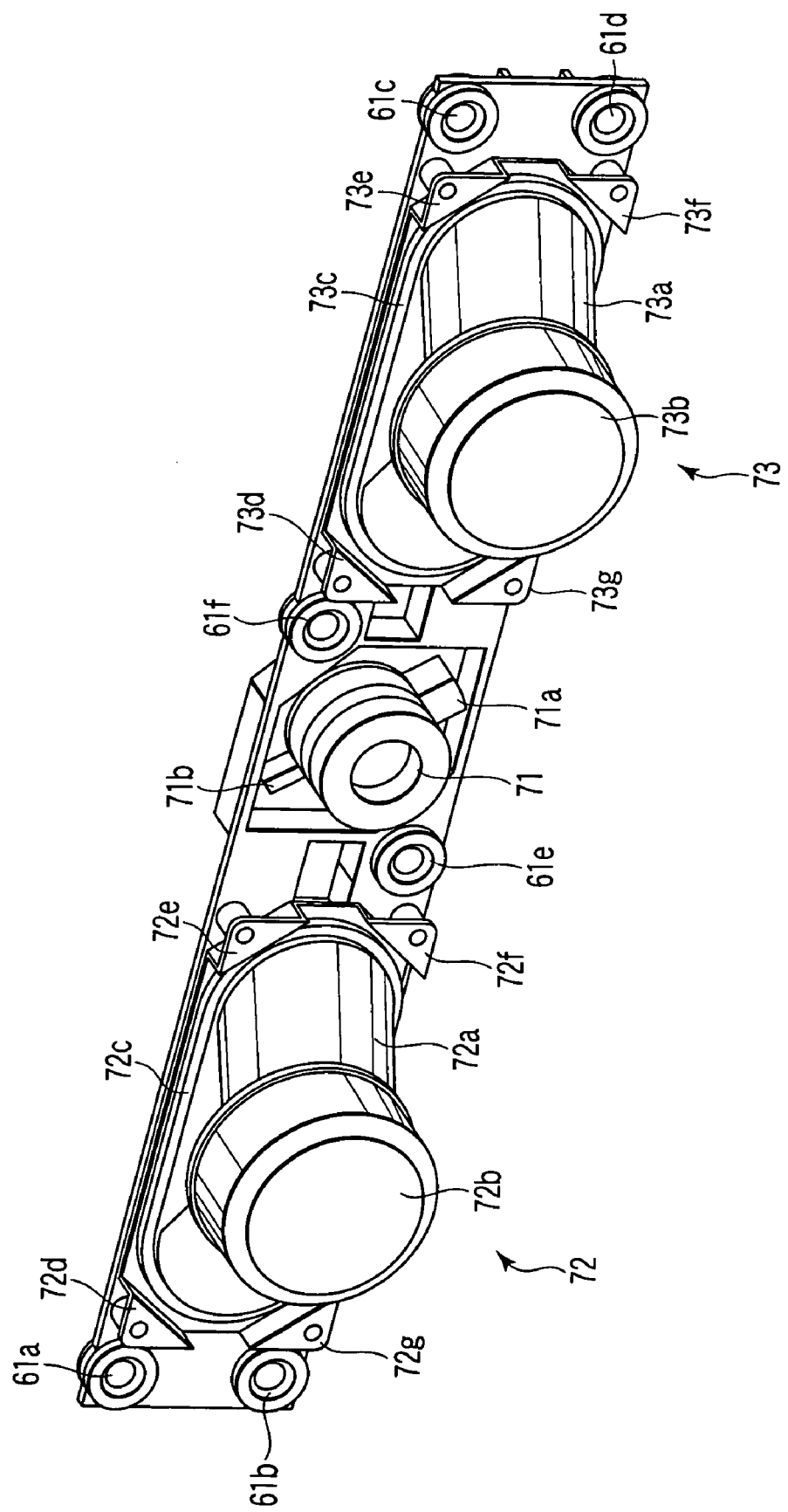
FIG. 4 is a perspective view showing a speaker device 60R shown in FIG. 3 by taking it out.

FIG. 3 is a view showing a speaker device 60R mounting portion as viewed from the back side of the cabinet 12 as against FIG. 2 which is the view as viewed from the front. The speaker device 60R is shown in FIG. 4 as well. Speaker devices are mounted on the right and left of the frame forming portion 12a4 of the cabinet, that is, to the back faces of the sound emitting units 21L and 21R of FIG. 1, respectively. Since both have the same configuration, one speaker device 60R will be described with reference to FIGS. 3 and 4.

The speaker device 60R has a rectangular unit substrate 61. The unit substrate 61 has mounting holes 61a, 61b, 61c and 61d at corners on the right and left and top and bottom thereof. The unit substrate 61 also has mounting holes 61e and 61f at positions deviated right and left at the top and bottom of a center region of the unit substrate 61. Elastic rings serving as vibration absorbers are provided to the mounting holes 61a to 61f, respectively. The elastic rings are arranged on the respective holes at one and the other surfaces of the unit substrate 61. The numbers of mounting holes and the vibration absorbers used for the holes are kept as small as possible to achieve cost reduction, decrease in the assembly man-hour, and convenience of assembly.

At the center in the horizontal direction and the center in the vertical direction of the unit substrate 61, a high-ranged sound speaker (so-called tweeter) 71 is mounted from the back side of the substrate 61. The high-ranged sound speaker 71 is fixed by mounting portions 71a and 71b to the unit substrate 61. The line which connects the mounting portions 71a and 71b crosses at right angles and intersects the line which connects the mounting holes 61e and 61f.

Furthermore, to the unit substrate 61, a low-ranged sound speaker 72 is mounted on the left side as viewed from the back side and a low-ranged sound speaker 73 is mounted on the right side. The speakers 72 and 73 have metal frames 72a and 73a with an elliptical opening, respectively, and drive portions 72b and 73b are integrated at the rear of the frames 72a and 73a, respectively. In addition, collars 72c and 73c are formed around the anterior openings of the frames 72a and 73a. Mounting pieces are formed at the corners of the collars 72c and 73c, and these mounting pieces are, for example, screwed to mounting protrusions formed upright in the unit substrate 61, respectively. Reference numerals 72d, 72e, 72f and 72g are mounting pieces of the speaker 72, and reference numerals 73d, 73e, 73f and 73g are mounting pieces of the speaker 73.

As shown in FIG. 3, on the rear face of the frame forming portion 12a4 of the frame 12a where the speaker device 60R is located, supporting portions 15a to 15f are formed upright integrally with the cabinet at the positions corresponding to the mounting holes 61a to 61f. In FIG. 3, the supporting portions 15a, 15b, 15e and 15f are viewed while the supporting portions 15c and 15d are hidden.

The speaker device 60R has the mounting holes 61a to 61f aligned to the supporting portions 15a to 15f, and screws are driven, for example, from the mounting holes 61a to 61f towards the supporting portions 15a to 15f. As a consequence, the speaker device 60R is integrated with the cabinet 12a.

In this case, a clearance is generated between the unit substrate 61 of the speaker device 60R and the back face of the frame forming portion 12a4 which forms the frame 12a.

Therefore, in this apparatus, a substrate 80 having indicators and a remote control receiver circuit mounted thereon is attached to the clearance. The remote control receiver circuit mounted on the substrate 80 faces the remote control signal receiving window 53, and the indicators such as LEDs face the indicator window 52. Because the substrate 80 is arranged in the clearance between the unit substrate 61 of the speaker device 60R and the frame forming portion 12a4, there is no need to specially expand the width W1 of the frame forming portion 12a4 in order to arrange the substrate 80. The substrate 80 is fixed to protruded pin-form supporting portions on the rear face of the frame forming portion 12a4 with screws or the like.

Figure 5:
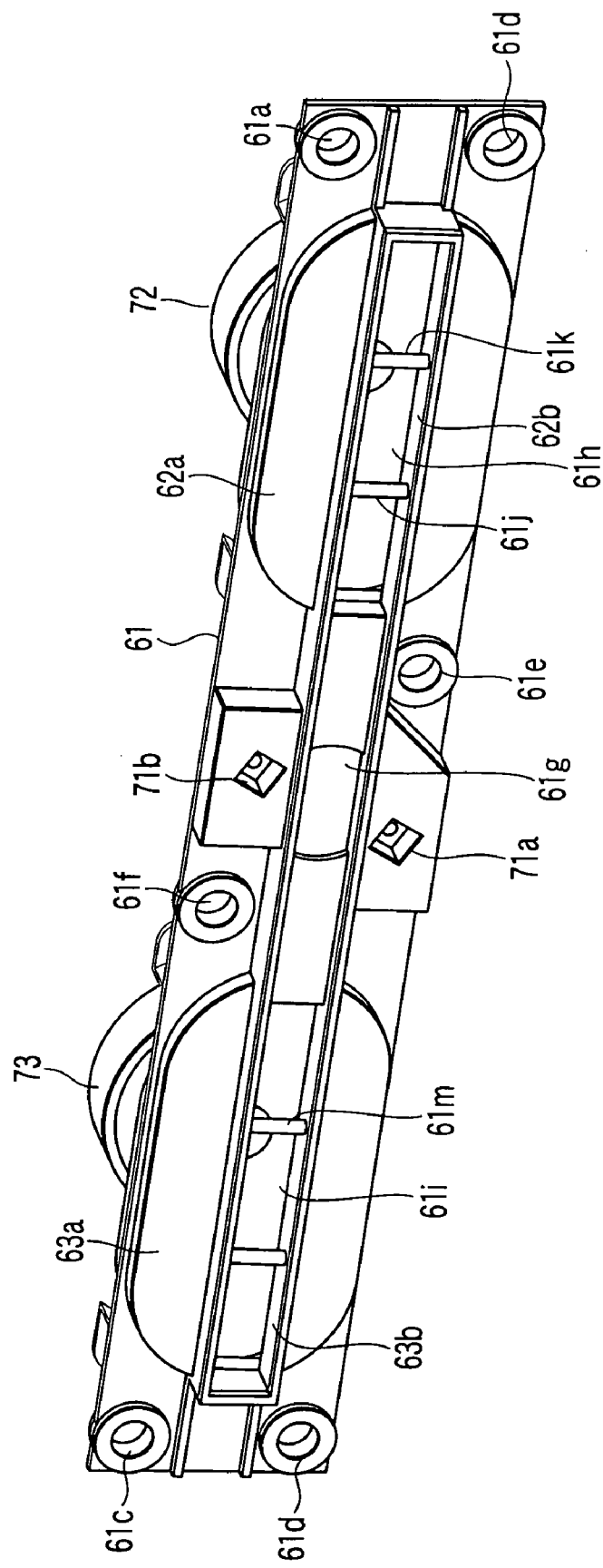
FIG. 5 is a perspective view showing the speaker device 60R shown in FIG. 4 as viewed from the front side.

FIG. 5 is a view of the speaker device 60R as viewed from the front side. In addition, an opening 61g is formed so as to correspond to the opening portion of the high-ranged sound speaker 71. In correspondence to the opening portions of the low-ranged sound speakers 72, 73, openings 61h and 61i are formed. Reference numerals 61j and 61k are beams installed to stabilize the width of the opening 61h at the time of manufacturing, and reference numerals 61l and 61m provided to the opening portion 61A are beams installed to stabilize the width of the opening 61i at the time of manufacture.

In the unit substrate 61, a chamber portion 62a which extends the opening of the speaker 72 forward is formed, and in addition, a chamber portion 63a which extends the opening of the speaker 73 forward is formed. Further, a guide portion 62b which accelerates air vibration by sound pressure inside of the chamber portion 62 and guides it to the horn part of the frame 12 is formed around the opening 61h, and protrudes anteriorly. Similarly, a guide portion 63b which accelerates air vibration by sound pressure inside of the chamber portion 63 and guides it to the horn part of the frame 12 is formed around the opening 61i, and protrudes anteriorly.

Figure 6:
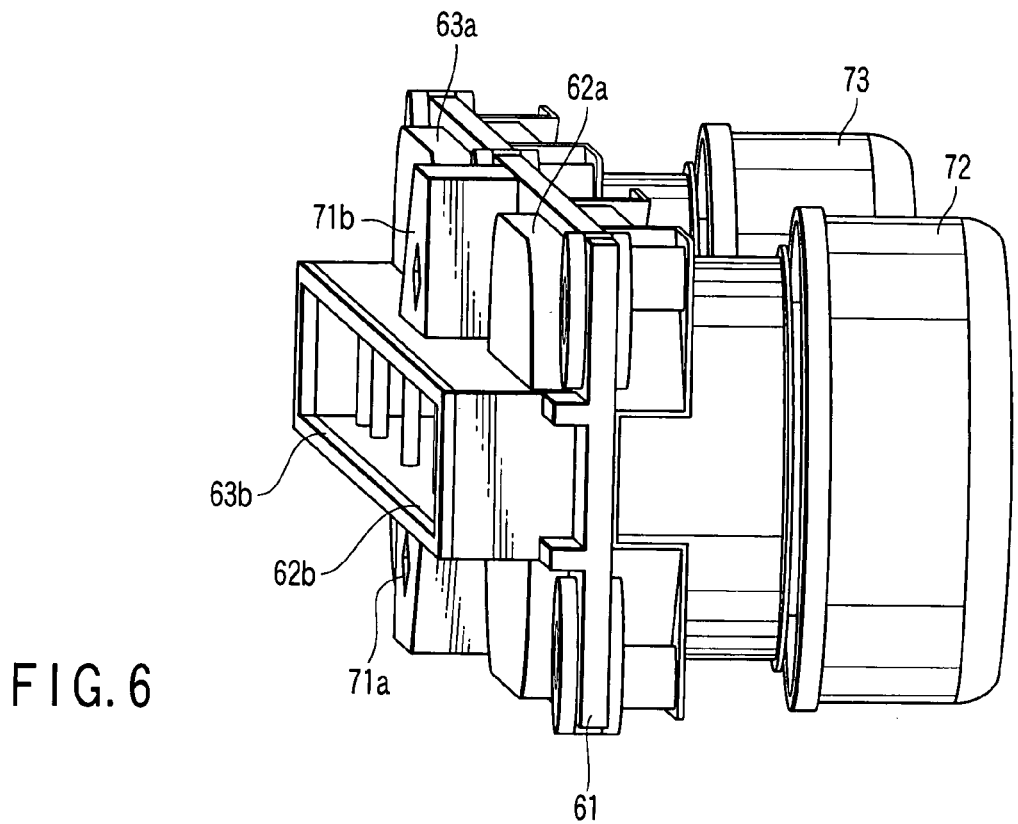
FIG. 6 is a perspective view showing the speaker device 60R shown in FIG. 5 as viewed from the side.

FIG. 6 is a view of the speaker device 60R as viewed from the side. The figure indicates that on the front side of the unit substrate 61, the above-described chamber portions 62a and 63a are protrudedly formed and the guide portions 62b and 63b are also protrudedly formed.

Now, the length of the unit substrate 61 in a short-side direction is, for example, within 110% of the length of the diameter of the speaker in the same direction when the speaker is arranged.

Figure 7:
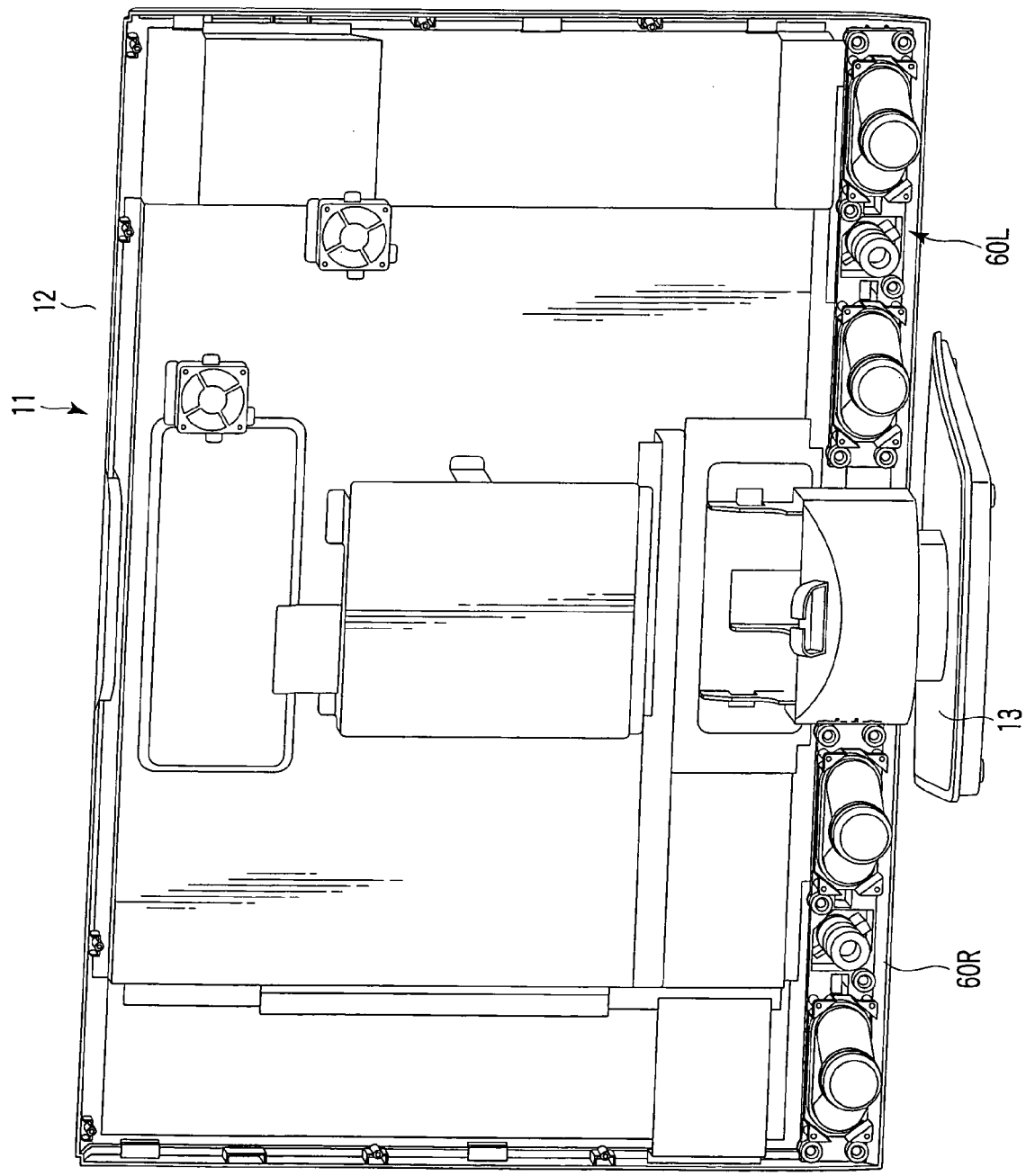
FIG. 7 is a view showing a state in which speaker devices are mounted with the image display apparatus shown in FIG. 1 as viewed from the back side.

FIG. 7 shows the back side of the above-mentioned cabinet 12. The speaker device 60R is mounted on the rear face of the frame forming portion 12a4 which forms the frame. A speaker device 60L on the left side is mounted as well. The speaker device 60L has the same configuration as that of the speaker device 60R, and a method of mounting to the frame forming portion is the same as the mounting method described above.

The speaker devices 60R and 60L are configured symmetrically with respect to a point with center at a central axis P of the high-ranged sound speaker at the center. The mounting holes 61e and 61f are symmetrical with respect to a point, the mounting holes 61a and 61d are also symmetrical with respect to a point, and the mounting holes 61b and 61c are also symmetrical with respect to a point. Furthermore, the speakers 72 and 73 are in the relation symmetrical with respect to a point as well.

This makes an assembly work easy. That is, it is possible to mount the speaker device 60R on the speaker device 60L side, and conversely, the speaker device 60L can be mounted on the speaker device 60R side. Further, even when the speaker device is turned upside down, for example, when the speaker device 60R is rotated with center at the central axis and reversed horizontally, the mounting holes and the supporting portions match, so that speakers can be easily mounted. This means that a high degree of freedom can be secured in postures at the time of transporting and receiving speaker devices when speaker devices are assembled in a cabinet on an assembly line. This facilitates production line design, and ensures extremely good efficiency and eliminates errors when assembly workers manually assemble image display apparatuses.

Figure 8:
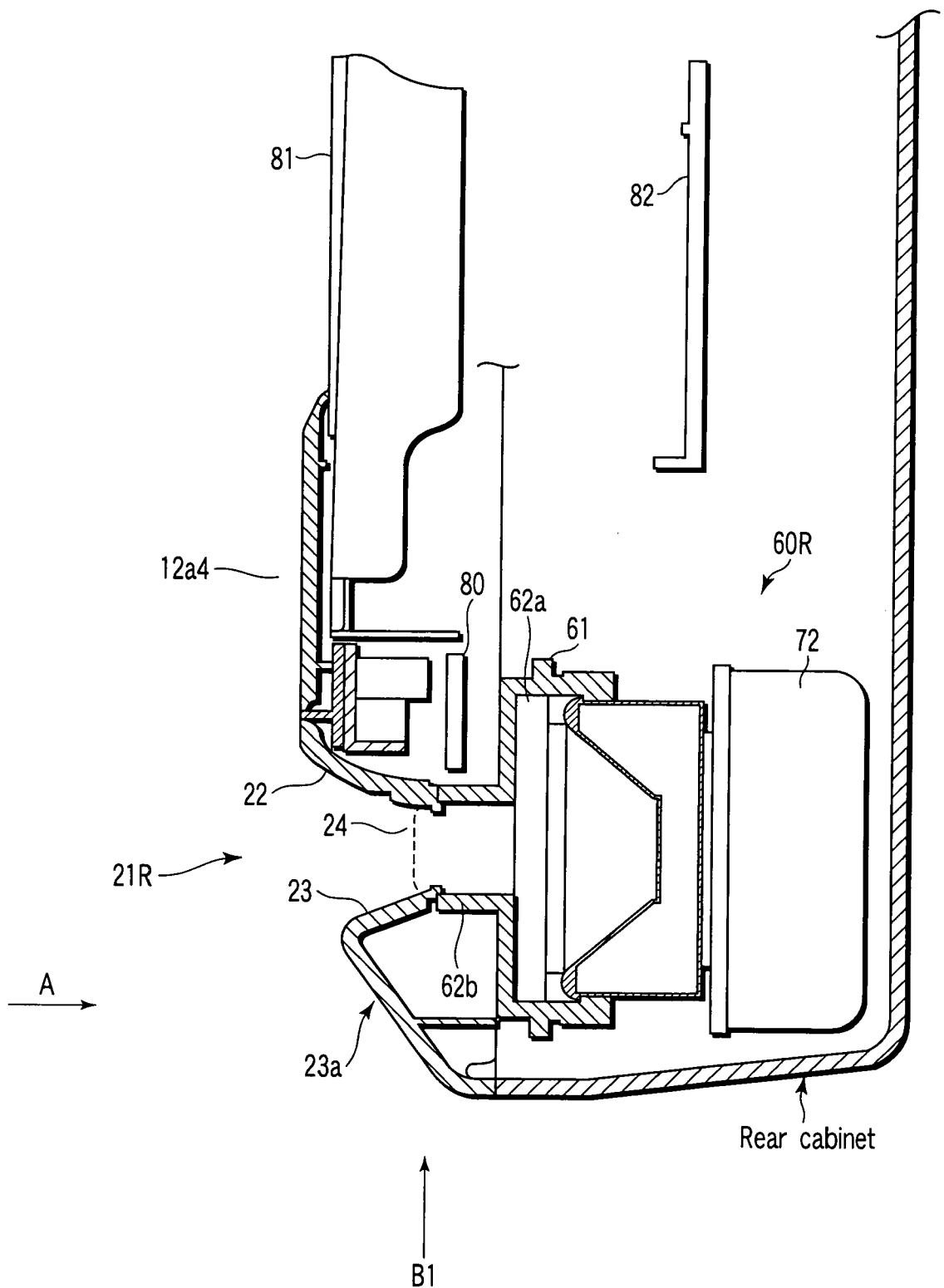
FIG. 8 is an illustration showing a mounting state of the speaker device and a frame forming portion in one embodiment.

FIG. 8 is a cross-sectional view showing the mounting state of the speaker device 60R and the frame forming portion 12a4 of the cabinet 12. Reference numeral 81 denotes a liquid crystal panel, and reference numeral 82 denotes a chassis plate.

In the sound emitting unit of the frame forming portion 12a4, the shapes of the top and bottom walls 22 and 23 are specially designed to improve acoustic effects, as described above. These walls 22 and 23 have a horn shape which bend and expand in such a manner as to depart away from each other in the top and bottom directions as they are oriented from the sound emitting opening to the front as viewed from the cross section. A net 24 is put up to the opening configured by the walls 22 and 23 (opposite surfaces to configure the horn part) and narrowed in width at the bottom.

Now, the lower wall (i.e., the cabinet surface) 23a which continues from the wall 23 has a profile as viewed from the cross section, which bends while returning backwards to the back side as shown in FIG. 8. Because of this kind of profile, the front face of the wall 23a provides a function which makes it less visually noticeable for the audience located in front of the apparatus. This is because, as compared to a wall which looks vertical as viewed from the front side and opposes to the audience, the wall 23a tilts and faces the audience while looking downward as viewed from the front side (as viewed in the arrow A direction) and reflection of light from this surface is not headed for the audience but is directed downwards. Consequently, when the frame portion is viewed from the front side, the frame edge, particularly, the speaker mounting region can be made to look smaller as viewed from the front side.

Figures 9A, 9B:
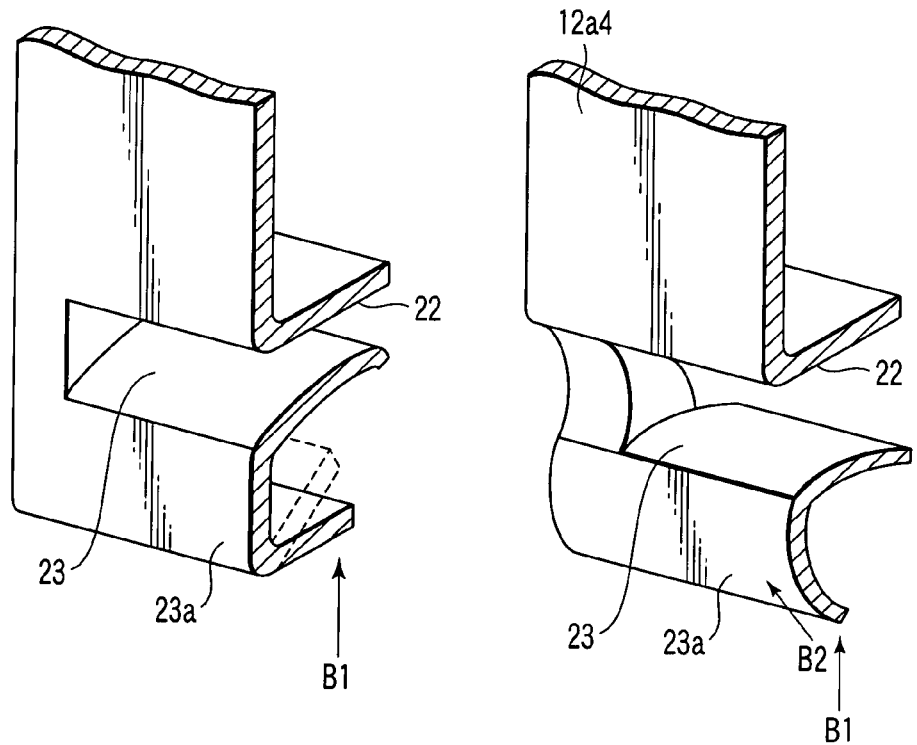
FIGS. 9A and 9B are illustrations shown to explain functions and effects of the frame forming portion shown in FIG. 8.

Furthermore, by adopting the above-mentioned profile, the strength of the frame 12a is reinforced when the apparatus is lifted with force applied to the bottom of the frame forming portion 12a4. Assuming that the apparatus has a configuration as shown in FIG. 9A, the force B1 is directly applied to the thickness direction of the frame forming portion, and thus, deformation is likely to occur. On the contrary, as shown in FIG. 9B, the force B1 applied to the bottom of the frame forming portion 12a4 is converted to the B2 direction and exerted to the width direction of the wall 23a. Consequently, the wall 23a is free of deformation, achieving advantage in transportation work.

As described above, in this apparatus, the speaker mounting region at the frame edge is designed to look smaller as viewed from the front side. Consequently, the sound emitting units 21R and 21L are designed to have a slender profile in the lateral direction. However, since this profile is adopted, the speaker opening is unable to be directly mounted on the rear face of the frame forming portion 12a4 in order to maintain or improve acoustic effects. Therefore, in this embodiment, the sound emitting units 21R and 21L are made to have a horn shape, and the speaker devices 60R and 60L are retreated from the back face of the frame forming portion 12a4 and arranged.

As a result, a clearance is generated between the speaker device 60R and the frame forming portion 12a4. Therefore, in this apparatus, the substrate 80 having the above-mentioned indicators and remote control receiver circuit mounted thereon is installed to the clearance in order to effectively utilize this clearance. The substrate 80 is arranged to the clearance between the unit substrate 61 of the speaker device 60R and the frame forming portion 12a4 without increasing the width W1 of the frame forming portion 12a4. The substrate 80 is fixed to protruded pin-form supporting portions on the rear face of the frame forming portion 12a4 with screws or the like.

Furthermore, as seen from FIG. 8, in the sound emitting unit 21R, the front protruded portion of the lower wall 23 is retreated as compared to the front protruded portion of the upper wall 22. Consequently, acoustic outputs provided by the sound emitting unit has a larger ratio of components which advance along the lower walls 23 and 23a as compared to that of the vertically symmetrical horn shape. Then, acoustic components which have advanced to the lower side are reflected by the floor and are transmitted forward. This is particularly effective for high-ranged components.

Note that the unit substrate 61, the chamber 62a, the guide portion 62b which extends the opening portion 61h and the sound emitting unit 21R may be an integral component. Alternatively, the unit substrate 61, the chamber 62a, and the guide portion 62b which extends the opening portion 61h may be an integral component, and the sound emitting unit 21R may be formed in the cabinet. In addition, to a contact portion of the front end of the guide portion 62a and the rear opening portion of the sound emitting unit 21R, elastic members are arranged to absorb vibrations and to prevent vibration sounds from coming out.

Needless to say, the above-mentioned chamber 62a, guide portion 62b, sound emitting unit 21R, and the like may be called cavities.

Figure 10:
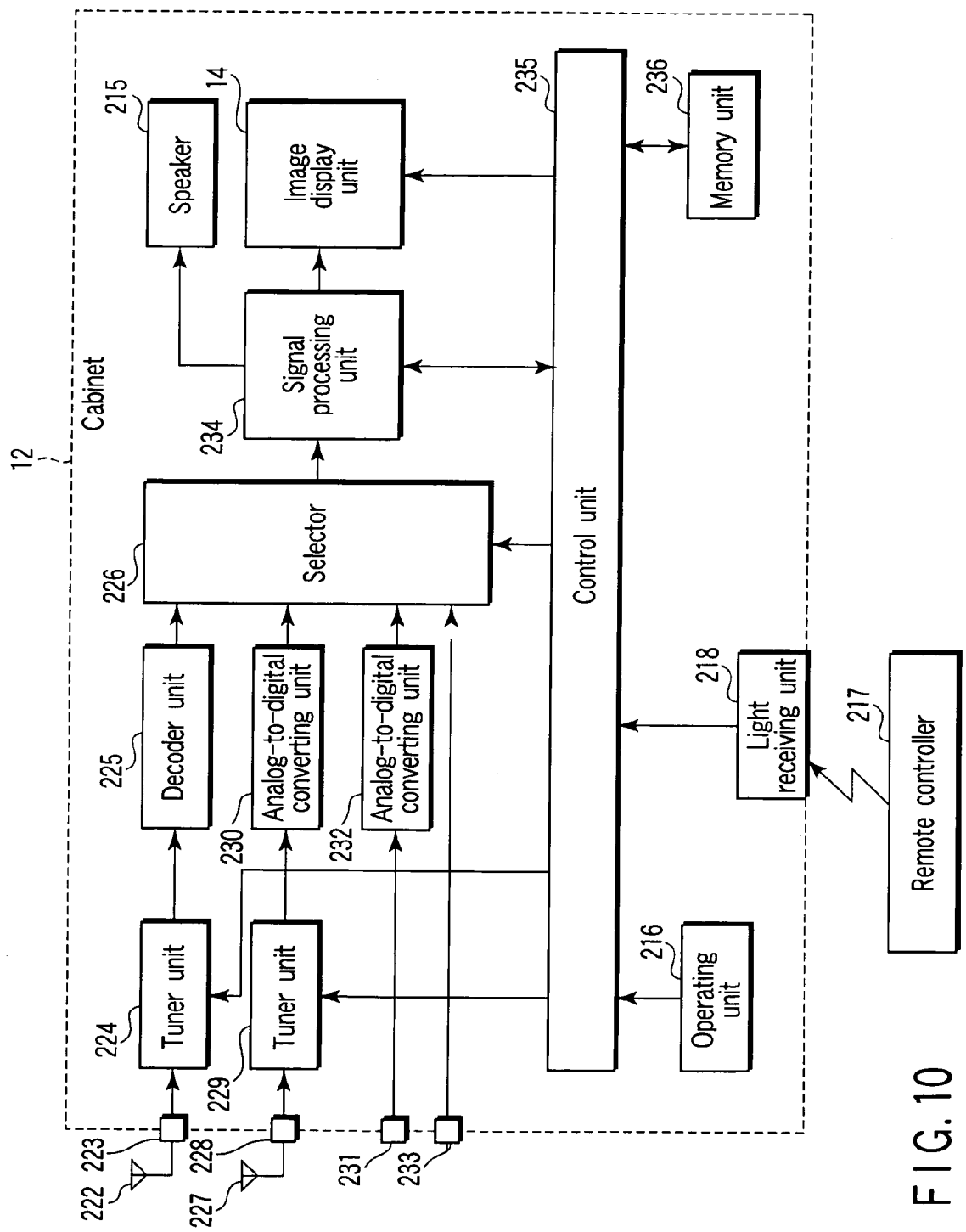
FIG. 10 is an exemplary diagram showing a circuit block of the image display apparatus of the embodiment.

FIG. 10 schematically shows a signal processing system of the TV broadcast receiving apparatus (image display apparatus) 11. Various kinds of circuit blocks which configure the signal processing system are primarily located inside the cabinet 12 and at the position close to the back face thereof, that is, in the vicinity of the rear face of the display screen 14a of the image display unit 14.

Digital TV broadcast signals received by an antenna 222 for receiving digital TV broadcast are supplied to a tuner unit 224 via an input terminal 223. The tuner unit 224 selects and demodulates signals of a desired channel from the input digital TV broadcast signals. Then, the signals outputted from the tuner unit 224 are supplied to a decoder unit 225, subjected to, for example, MPEG (moving picture experts group) 2-decode processing, and then supplied to a selector 26.

Further, analog TV broadcast signals received by the antenna 227 for receiving analog TV broadcast are supplied to a tuner unit 229 via an input terminal 228. The tuner unit 229 selects and demodulates signals of a desired channel from the input analog TV broadcast signals. Then, the signals outputted from the tuner unit 229 are outputted to the selector 226 after being digitized at an analog/digital (A/D) converting unit 230.

In addition, analog video and audio signals supplied to an input terminal 231 for analog signals are supplied to an A/D converting unit 232 to be digitized, and then are outputted to the selector 226. Furthermore, digital video and audio signals supplied to an input terminal 233 for digital signals are supplied to the selector 226 as they are.

The selector 226 selects one of four kinds of input digital video and audio signals and supplies the selected signal to a signal processing unit 234. The signal processing unit 234 provides a predetermined signal processing to the inputted digital video signal to submit them for image display at the image display unit 14. For the image display unit 14, for example, a flash panel display comprising a liquid crystal display, a plasma display, etc. is adopted. In addition, the signal processing unit 234 provides a predetermined signal processing to the input digital audio signal, converts it into an analog signal, and outputs the analog signal to the speaker 215 (corresponds to the above-mentioned speaker devices 60R and 60L) to reproduce sound.

Now, the TV broadcast receiving apparatus 11 has various operations including various kinds of receiving operations described above overall controlled by a control unit 235. The control unit 235 is a microprocessor incorporating a central processing unit (CPU) and the like. Upon receipt of operation information from an operating unit 216 and an operator 221 (not shown) or operation information transmitted from a remote controller 17 via a light receiving unit 218, the control unit 235 controls the units, respectively, in such a manner as to reflect the operation content.

In this case, the control unit 235 uses a memory unit 236. The memory unit 236 is primarily equipped with a read only memory (ROM) which stores control programs executed by its CPU, a random access memory (RAM) for providing work areas to the CPU, and a nonvolatile memory in which various kinds of setting information, control information, and the like are stored.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image display apparatus with an image display unit and a speaker device mounted on a cabinet, comprising:
   a front frame forming the cabinet, on which a display screen of the image display unit is arranged so as to be exposed from an opening at the center thereof;
   a frame forming portion which forms a part of the front frame and is positioned at the lower part of the front frame;
   a sound emitting unit which forms a rear opening at a position where opposite surfaces which open elongatedly in a longitudinal direction of the frame forming portion and which form a horn part with the opening used for a front opening are tentatively retreated while being bent to come close to each other as they are oriented from the front opening to the rear opening as viewed from the cross section;
   a remote control signal receiving window formed in the frame forming portion in the vicinity of the sound emitting unit of the frame forming portion;
   supporting portions formed upright around the rear opening on the rear face of the frame forming portion; and
   speaker devices mounted on the supporting portions and having an opening which serves as an acoustic output unit, the opening being communicated with the rear opening of the sound emitting unit; and
   a substrate arranged between the speaker device and the frame forming portion so as to be opposed to the remote control signal receiving window, the substrate having a remote control circuit mounted thereon.

2. A display apparatus, comprising:
   a display unit including a display screen;
   a sound emitting unit having a front opening and a rear opening of a hone part;
   a cabinet for holding the display unit, the cabinet including a frame with first and second openings and a window, the first opening exposing the display screen and the second opening being connected to the front opening of the sound emitting unit, wherein the first and second openings and the window face toward a front side of the display screen;
   a speaker device on supporting portions in the cabinet, the speaker device including an opening for communicating with the rear opening of the sound emitting unit; and a substrate of a circuit arranged in a space between the window, the sound emitting unit, and the speaker device, the substrate being used as an indicator or a remote control signal receiver.

3. The display apparatus according to claim 2, wherein the window is used for an indicator window and/or a remote control signal receiving window.

4. The display apparatus according to claim 3, further comprising an inclined surface provided as an edging area of the frame, and near the second opening, and inclined rearwards relative to the display screen.

5. The display apparatus according to claim 2, wherein:
   the second opening opens elongatedly in a longitudinal direction of the frame;
   the supporting portions are formed upright around the sound emitting unit on the inner face of the frame; and
   the opening of the speaker device serves as an acoustic output unit, the speaker device being mounted on the supporting portions in such a manner that the opening matches the rear opening of the sound emitting unit.

6. The image display apparatus according to claim 2, wherein the sound emitting unit and the speaker device are integrally configured.

7. The image display apparatus according to claim 2, wherein the sound emitting unit and the speaker device are configured separately and integrated by assembling.

8. The image display apparatus according to claim 2, wherein:
   the window is used for a remote control signal receiving window;
   the remote control signal receiving window is formed near the sound emitting unit; and
   the substrate is arranged between the remote control signal receiving window and the speaker device.

9. The image display apparatus according to claim 2, wherein:
   the window is used for an indicator window;
   the indicator window is formed near the sound emitting unit; and
   the substrate is arranged between the indicator window and the speaker device.

* * * * *

UNITED STATES PATENT AND TRADEMARK OFFICE
CERTIFICATE OF CORRECTION

| | | |
|---|---|---|
| PATENT NO. | : 7,953,242 B2 | Page 1 of 1 |
| APPLICATION NO. | : 11/448815 | |
| DATED | : May 31, 2011 | |
| INVENTOR(S) | : Soga | |

It is certified that error appears in the above-identified patent and that said Letters Patent is hereby corrected as shown below:

Claim 2, column 8, line 57, change "a hone part" to --a horn part--.

Claim 2, column 9, line 1, change "circuitarranged" to --circuit arranged--.

Signed and Sealed this

Sixteenth Day of August, 2011

David J. Kappos
*Director of the United States Patent and Trademark Office*